2,851,434
Patented Sept. 9, 1958

2,851,434
PROCESS OF MAKING ACRYLONITRILE POLYMER SOLUTIONS

Evan Islwyn Jones and Leonard Wood, Blackley, Manchester, England, assignors to Imperial Chemical Industries Limited, London, England, a corporation of Great Britain No Drawing. Application May 12, 1955
Serial No. 508,001

Claims priority, application Great Britain May 21, 1954

4 Claims. (Cl. 260—29.6)

This invention relates to a new and improved process for the preparation of compositions of acrylonitrile polymers. In particular it relates to a method of mixing polymers of acrylonitrile with ethylene carbonate/water mixtures to form a product, which when heated is converted into a viscous solution suitable for the production of shaped articles such as filaments, yarns and the like.

In the phrase "acrilonitrile polymers" we include polyacrylonitrile, copolymers of acrylonitrile and other vinyl compounds containing a major proportion of acrylonitrile in the polymer molecule, and grafted polymers of acrylonitrile. By the term "grafted acrylonitrile polymer" we mean a polymer obtained by polymerising acrylonitrile alone or in the presence of a minor amount of one or more other monomeric vinyl compounds, in the presence of one or more other polymeric substances. The free radicals formed during the polymerisation process react with the polymeric substance and this brings about a chemical combination of the newly formed polymer and the polymeric substance already present. Grafted acrylonitrile polymers cannot be separated into their constituent parts by physical methods, because the two or more polymeric materials are chemically combined.

The use of compositions comprising an acrylonitrile polymer, ethylene carbonate and water in the production of shaped articles from acrylonitrile polymers, is claimed in our copending U. S. applications Serial Nos. 341,336 and 413,366, now Patents Nos. 2,734,040 and 2,734,041, respectively. In these specifications the compositions were formed by first slurrying the acrylonitrile polymer with the cool solvent in liquid form, or by adding the polymer to part or all of the water to form a water wet powder, which could then be mixed at an elevated temperature with ethylene carbonate or aqueous ethylene carbonate. We have now found an improved process for the preparation of these compositions of acrylonitrile polymers.

According to the present invention we provide a new and improved process for the preparation of compositions of acrylonitrile polymers, ethylene carbonate and water, wherein one of the organic components of the composition is mixed with water and this mixture in the solid state is then mixed with the remaining organic component, also in the solid state, if desired after mixing said remaining organic component with an additional quantity of water.

The present invention also comprises the conversion of these compositions by heat into a solution suitable for the production of shaped articles and in particular for spinning into filaments, yarns and the like.

The following examples, in which all parts and percentages are by weight, illustrate, but do not limit the scope of our invention.

Example 1

A grafted acrylonitrile polymer, containing approximately 12% polyvinyl alcohol, the remainder being polyacrylonitrile, was cooled to 15° C., in a finely powdered, dry state, and a 75/25 ethylene carbonate/water mixture was separately cooled to the same temperature to form fine crystals. 20 parts of the grafted polymer were then mixed with 80 parts of the ethylene carbonate/water mixture. On heating this mixture to 85° C.–95° C., a viscous solution suitable for spinning into fibres was formed.

Example 2

A grafted acrylonitrile polymer (56.6 parts), containing approximately 15% polyvinyl alcohol, the remainder being polyacrylonitrile, and having been previously dried until the wet paste contained 55% of water, was intimately mixed with ethylene carbonate (120 parts) which had previously been ground to pass through a ten mesh sieve, to give a free flowing mixture and which, after storage for four days in a refrigerator at 10° C. was still free flowing.

On heating the mixture to 90° C. a clear viscous solution suitable for spinning into fibres was obtained.

Example 3

25 parts of a dry, finely powdered copolymer consisting of 95/5 acrylonitrile/2-vinyl pyridine were mixed with 30.5 parts of water containing 0.5 part of benzoic acid in solution. The wet powder was cooled by storing overnight in a refrigerator at −2° C. 195 parts of ethylene carbonate crystals, containing 98% ethylene carbonate by analysis, were ground to a fine powder and similarly cooled. The ethylene carbonate was added to the wet polymer powder and well mixed. The mixture was heated in a waterbath at 90°–95° C. for 1 hour to form a viscous solution which was stirred for a further half hour at 85°–90° C. to disperse gel particles and to homogenize. A clear solution having a viscosity as measured by the falling-sphere method, of 110 poises at 88° C., suitable for spinning into fibres, was formed.

Example 4

The same proportions and procedure as described in Example 3 were used in the case of a homopolymer of acrylonitrile to give a clear solution, of falling-sphere viscosity 15 poises at 88° C., which was suitable for spinning into fibres.

Mixtures of ethylene carbonate and water have melting point ranging from 39°–40° C. for the anhydrous ethylene carbonate to approximately 21°–23° C. for a mixture containing 60 parts by weight of ethylene carbonate and 40 parts by weight of water. It is preferable to mix the components of the composition of our invention at a lower temperature than the melting point of the particular mixture employed. For instance, when using solvent mixtures containing up to 85% by weight of ethylene carbonate, which melt at 25° C. or lower, it is preferable to mix at temperatures below 20° C. It is also preferred to ensure that the grafted polymer is at a low temperature during the admixture.

One particular advantage of this method of mixing is that higher concentrations of polymer can be tolerated since the tendency of the polymer to aggregate into lumps, which when heated become gel-particles, is greatly reduced. Another advantage is that the solid mixture of polymer and solvent can be stored almost indefinitely at low temperatures without deterioration in properties. Still another advantage is that this method lends itself admirable to the continuous mechanical production of solution. For instance, the two separate powdered solids can be fed in the required proportion to a channel or vessel leading into a heated dissolving chamber and thence to the main solution line.

For instance, even when extreme precautions are taken it is difficult to avoid aggregation of the polymer, even in concentrations of 12–15% when mixed with the cool solvent in liquid form, for example at 35° C. for a 75/25 ethylene carbonate/water mixture. If such a slurry is stored for a few hours the flow properties change and unless it is kept well stirred sedimentation also occurs. In contrast, admixture by the process of our invention allows concentrations of 20% and more of polymer to be used without aggregation and without profound changes in flow properties or sedimentation occurring on storage.

The present method can also be used with acrylonitrile polymers which have not been thoroughly dried and ground after polymerisation and washing, provided allowance is made for the water content of the polymer in making up the mixture. Neither need the ethylene carbonate used be initially thoroughly dried.

When it is desired to heat the compositions of our invention e. g. to form a spinning solution of the acrylonitrile polymer, it is advisable to add to the composition a heat stabiliser, to prevent decomposition of the ethylene carbonate, which may give rise to gas bubble formation during spinning. We have found that weak organic acids, such as benzoic acid (as used in Example 3) or salicylic acid are satisfactory heat stabilisers.

What we claim is:

1. In a process for the preparation of compositions comprising (a) acrylonitrile polymers selected from the group consisting of polyacrylonitrile, copolymers of acrylonitriles and other vinyl compounds containing a major proportion of acrylonitrile in the polymer molecule and grafted polymers of acrylonitrile, and (b) ethylene carbonate and (c) water containing more than 60% by weight of ethylene carbonate the improvement which comprises mixing one of the organic components (a) and (b) of the composition with water at a temperature in the range of —2° C. to 20° C. and the solid mixture thus resulting is mixed with the other of said organic components while still maintaining the temperature within said range.

2. The process of claim 1 wherein said other of said organic components is first mixed with an additional quantity of water before it is added to said solid mixture.

3. A process according to claim 1, wherein an aromatic monocarboxylic acid as a heat stabiliser for the ethylene carbonate is included in the composition.

4. A process according to claim 3, wherein said aromatic monocarboxylic acid is benzoic acid.

References Cited in the file of this patent

UNITED STATES PATENTS 2,734,041     Jones et al.     Feb. 7, 1956